United States Patent [19]
Cavedo

[11] Patent Number: 5,049,012
[45] Date of Patent: Sep. 17, 1991

[54] AUXILIARY HANDLE FOR HAND-HELD DRILL

[75] Inventor: Robert P. Cavedo, Easley, S.C.

[73] Assignee: Ryobi Motor Products Corp., Pickens, S.C.

[21] Appl. No.: 667,346

[22] Filed: Mar. 11, 1991

[51] Int. Cl.[5] .............................................. B23B 45/00
[52] U.S. Cl. ............................. 408/241 R; 16/114 R; 408/241 S
[58] Field of Search .................. 408/14, 241 R, 241 S, 408/238, 72 R; 16/110 R, 111 R, 114 R

[56] References Cited

U.S. PATENT DOCUMENTS

| | | | |
|---|---|---|---|
| 3,537,336 | 11/1970 | Schmuck | 408/72 R |
| 4,276,675 | 7/1981 | Pioch | 16/111 R |
| 4,354,779 | 10/1982 | Vaughn | 408/241 S |
| 4,368,556 | 1/1983 | Wanner et al. | 16/111 R |
| 4,820,090 | 4/1989 | Chen | 408/241 |
| 4,881,294 | 11/1989 | Riedl | 16/114 |

OTHER PUBLICATIONS

Catalog Page showing Black & Decker Model 7194-1 Drill.

*Primary Examiner*—Daniel W. Howell
*Attorney, Agent, or Firm*—David L. Davis

[57] ABSTRACT

An auxiliary handle for a drill includes a unitary member with an elongated handle portion and a collar portion. The collar portion has a circular opening sized to accomodate therein a cylindrical shoulder at the forward end of the drill. The unitary member is formed with an open slot extending from the circular opening of the collar portion into the handle portion, the open slot providing a separation in the collar portion. A clamping arrangement extends across the slot for selectively narrowing the slot to reduce the circumference of the circular opening so as to clamp the handle on the drill shoulder accommodated therein.

6 Claims, 2 Drawing Sheets

AUXILIARY HANDLE FOR HAND-HELD DRILL

BACKGROUND OF THE INVENTION

This invention relates to hand-held tools such as electric drills and, more particularly, to an auxiliary handle for such a tool.

Portable electric drills are typically configured with a pistol grip toward the rear end, by means of which the operator can use one hand to hold, manipulate and control the operation of the drill. It is often desirable to provide a secondary, or auxiliary, handle toward the forward end of the drill to effect two-handed operation. This is frequently the case with larger drills which are often awkward and unbalanced when used in a one-handed manner.

A common way in the past of providing such an auxiliary handle was to have internally threaded blind holes provided in the body of the drill at one or more locations near the forward end of the drill and providing an auxiliary handle having a threaded end for selective insertion into one of the holes. This arrangement is disadvantageous in that, for example, only a very limited number of angular orientations of the handle around the drilling axis of the drill may be accommodated. Also, additional machining of the drill is required.

Arrangements are also known whereby an auxiliary handle may be mounted on a cylindrical portion of the drill housing and for rotation to any desired angle within a 360° range. An example of such an arrangement is disclosed in U.S. Pat. No. 3,537,336. However, that disclosed arrangement is disadvantageous in that there are numerous parts which increases its cost of manufacture. Another such arrangement is disclosed in U.S. Pat. No. 4,881,294, which suffers from the same disadvantages. A third arrangement is disclosed in U.S. Pat. No. 4,820,090, but this arrangement lacks means for locking the auxiliary handle at a desired angular orientation.

It is therefore a primary object of the present invention to provide an auxiliary handle for a drill which is simple to manufacture and use and which avoids the disadvantages enumerated above.

It is another object of this invention to provide such a handle which includes the provision for holding a depth stop.

SUMMARY OF THE INVENTION

The foregoing, and additional, objects are attained in accordance with the principles of this invention by providing an auxiliary handle for a drill, the drill having a cylindrical shoulder portion at its forward end. The auxiliary handle includes a unitary member having an elongated handle portion and a collar portion adjacent thereto. The handle portion has a major axis and is generally cylindrical about the major axis. The collar portion is generally planar parallel to the major axis and has a generally circular opening having an axis transverse to the major axis. The circular opening is sized to accommodate therein the shoulder portion of the drill. The unitary member is formed with an open slot extending generally along the major axis from the circular opening into the handle portion, the open slot providing a separation in the collar portion. The auxiliary handle also includes clamp means extending across the slot for selectively narrowing the slot to reduce the circumference of the circular opening so as to clamp the auxiliary handle on the drill shoulder portion accommodated therein.

BRIEF DESCRIPTION OF THE DRAWINGS

The foregoing will be more readily apparent upon reading the following description in conjunction with the drawings in which like elements in different figures thereof have the same reference numeral applied thereto and wherein.

DETAILED DESCRIPTION

Figure 1:
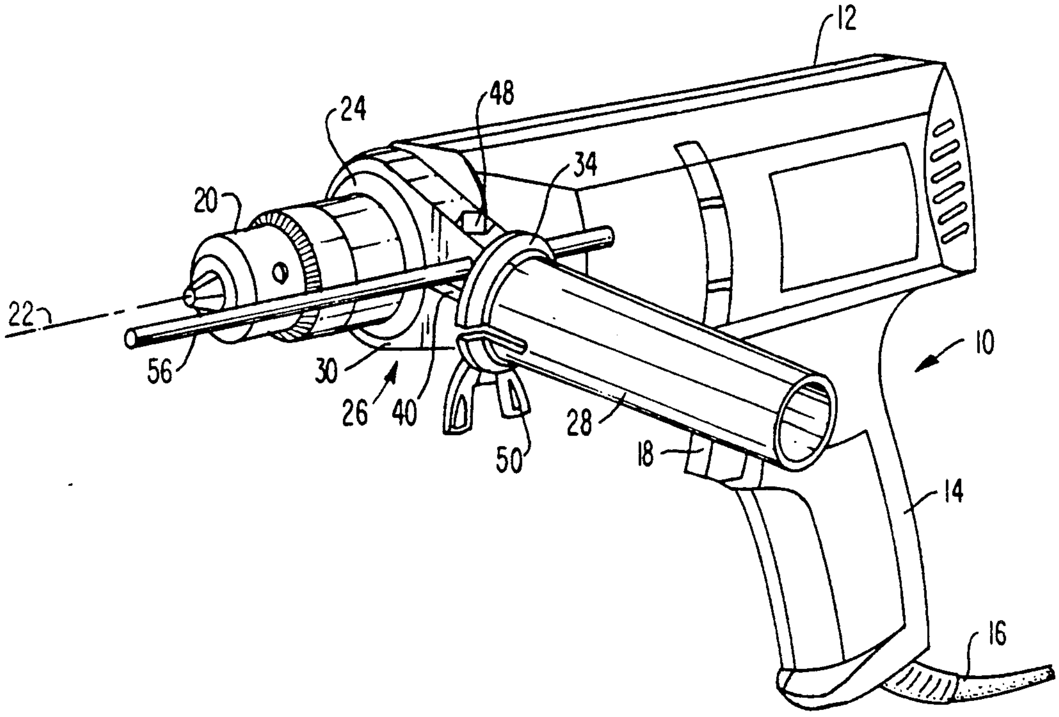
FIG. 1 is a perspective view of a portable electric drill having mounted thereon an auxiliary handle constructed in accordance with the principles of this invention.
Figure 2:
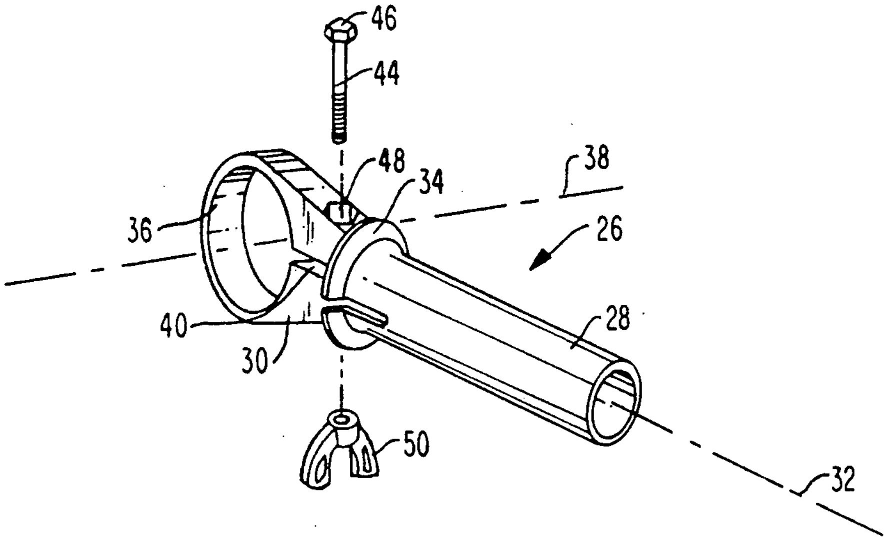
FIG. 2 is an exploded perspective view of the auxiliary handle shown in FIG. 1.

Referring now to the drawings, FIG. 1 illustrates a portable electric drill, designated generally by the reference numeral 10, which has a main body portion 12 and a pistol grip type handle portion 14 at the rear of the body portion 12. A drive motor (not shown) is contained within the body portion 12 and is driven from a source of commercially available power via the line cord 16 through a trigger switch 18 mounted for operator manipulation in the handle portion 14. Although the drill 10 is shown as being connected to commercially available power through a line cord 16, the present invention also applies to a battery operated tool.

As is conventional, the drill 10 has at its forward end a tool holding chuck 20 which is rotatably coupled to the shaft of the motor within the body portion 12. The chuck 20 is generally cylindrical and rotates about its major axis, which defines the drilling axis 22 of the drill 10. Between the chuck 20 and the main body portion 12, the forward end of the drill 10 is formed with a generally cylindrical shoulder 24 whose major axis is parallel to the drilling axis 22. The foregoing is conventional and does not form a part of the present invention.

According to this invention, there is provided an auxiliary, or secondary, handle, designated generally by the reference numeral 26, which is designed to fit over the shoulder 24, be rotatable about the drilling axis 22 to any desired angular orientation, be lockable in the desired angular orientation, and support a depth stop. The auxiliary handle 26 includes a unitary member having an elongated handle portion 28 and a collar portion 30 adjacent thereto. The handle portion 28 has a major axis 32 and is generally cylindrical thereabout. The collar portion 30 is separated from the handle portion 28 by a flange 34 and is generally planar parallel to the major axis 32. The collar portion 30 has a generally circular opening 36 which is sized to accommodate therein the shoulder 24 at the forward end of the drill 10. The circular opening 36 has an axis 38 which is transverse to the major axis 32 of the handle portion 28.

Figure 3:
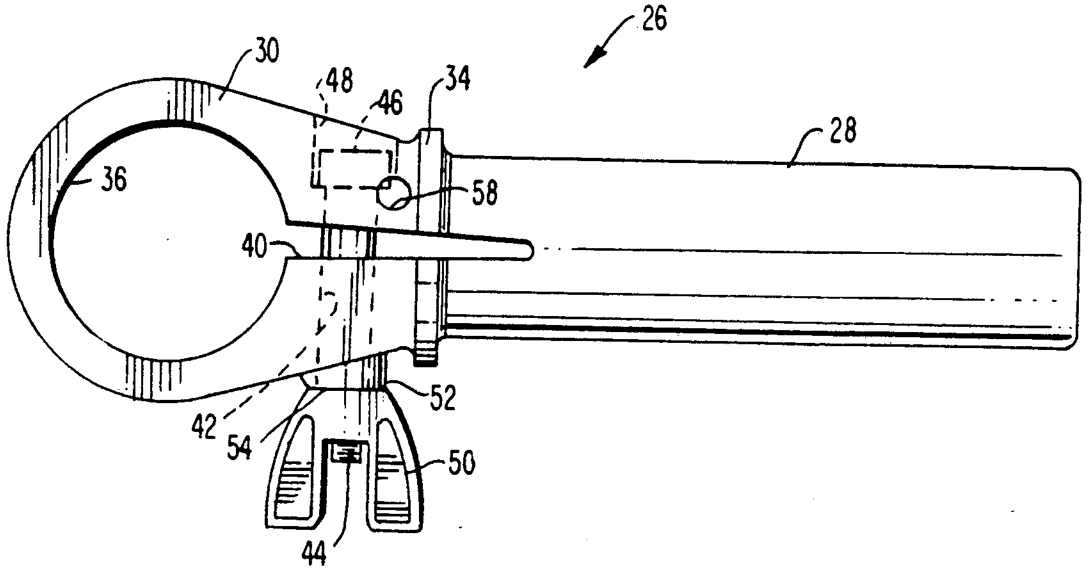
FIG. 3 is an elevational view showing the auxiliary handle with the clamp means in a loosened condition.

The unitary member forming part of the auxiliary handle 26 is formed with an open slot 40 which extends generally along the major axis 32 from the circular opening 36, through the collar portion 30, and into the handle portion 28 to provide a separation in the collar portion 30. Preferably, as is best illustrated in FIG. 3, the open slot 40 is tapered, with its greatest width being where it meets the circular opening 36.

The auxiliary handle 26 also includes a clamping arrangement for selectively narrowing the slot 40 to reduce the circumference of the circular opening 36. This is utilized to effect a clamping action of the collar portion 30 on the shoulder 24 in a desired angular orientation of the auxiliary handle 26 about the drilling axis 22.

Figure 4:
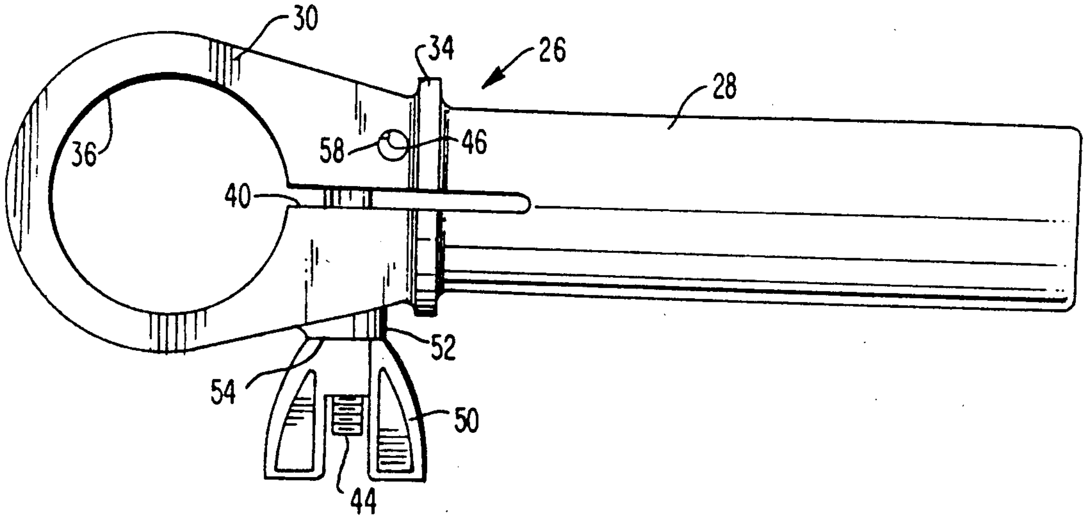
FIG. 4 is a view similar to FIG. 3 showing the auxiliary handle with the clamp means in a tightened condition.

Illustratively, the clamping arrangement includes a channel 42 formed in the collar portion 30 and extending substantially orthogonally across the slot 40. A threaded member 44 having an enlarged head 46 is positioned in the channel 42. The head 46 is flatted and the channel 42 is enlarged and internally flatted at 48 to accommodate the head 46 therein and prevent the threaded member 44 from rotating. When the threaded member 44 is positioned in the channel 42 with the head 46 seated in the enlarged portion 48, the lower side of the head 46 bears against the inner surface of the enlarged portion 48. A wing nut 50 is provided which threadedly engages the threaded member 44 at the end opposite the head 46. The collar portion 40 is formed with a boss 52 terminating the channel 42 and providing a flat surface 54 against which the wing nut 50 can apply pressure. When the wing nut 50 is rotated in a first direction (i.e., clockwise) on the threaded member 44, the distance between the enlarged head 46 and the wing nut 50 is decreased. This applies pressure to both the inner surface of the enlarged portion 48 and the surface 54 of the boss 52 so as to deform the collar portion 30, narrow the slot 40 and thereby reduce the circumference of the circular opening 36. This is clearly shown by a comparison of FIGS. 3 and 4, which illustrate the conditions with the wing nut 50 loosened and tightened, respectively, on the threaded member 44.

It is often desired to drill a single hole or a series of holes to a preestablished depth without requiring the measurement of the actual hole depth. Toward this end, there is often provided in conjunction with a drill a depth stop which is typically a rod extending beyond the forward end of the drill to a point where the distance between the forward tip of the rod and the forward tip of the drill bit is equal to the desired hole depth. Such a depth stop rod 56 is shown in FIG. 1. To accommodate the rod 56, the auxiliary handle 26 is formed with a bore 58 extending through the collar portion 30 along an axis parallel to the drilling axis 22, with the bore 58 being sized to closely accommodate the rod 56 therethrough. The bore 58 intersects the enlarged portion 48 of the channel 42 so as to expose a portion of the enlarged head 46 when the threaded member is positioned in the channel 42. This exposed portion of the head 46 engages the rod 56. Accordingly, when the rod 56 is positioned in the bore 58 and the wing nut 50 is tightened on the threaded member 44, the exposed portion of the head 46 bears against the rod 56 to secure the rod 56 to the handle 26 and thereby set the desired depth.

Accordingly, there has been disclosed an improved auxiliary handle for a hand-held drill. While an exemplary embodiment has been disclosed herein, it will be appreciated by those skilled in the art that various modifications and adaptations to the disclosed embodiment may be made and it is only intended that this invention be limited by the scope of the appended claims.

I claim:

1. An auxiliary handle for a drill, said drill having a cylindrical shoulder portion at its forward end, the handle comprising:

a unitary member having an elongated handle portion and a collar portion adjacent thereto, said handle portion having a major axis and being generally cylindrical about said major axis, said collar portion being generally planar parallel to said major axis and having a generally circular opening having an axis transverse to said major axis, said circular opening being sized to accommodate therein the shoulder portion of the drill, said unitary member being formed with an open slot extending generally along said major axis from said circular opening into said handle portion, said open slot providing a separation in said collar portion; and clamp means extending across said slot for selectively narrowing said slot to reduce the circumference of said circular opening so as to clamp said auxiliary handle on the drill shoulder portion accommodated therein.

2. The handle according to claim 1 wherein said clamp means includes:

a channel formed in said collar portion and extending across said slot substantially orthogonal thereto;

a threaded member positioned in said channel and having an enlarged head bearing against a first surface of said collar portion on a first side of said slot;

means for preventing said threaded member from rotating; and nut means threadedly engaging said threaded member and bearing against a second surface of said collar portion on the second side of said slot;

whereby rotation of said nut means in a first direction decreases the distance between said nut means and said enlarged head so as to deform said collar portion and narrow said slot.

3. The handle according to claim 1 further including:

a depth stop rod; and means for holding said depth stop rod parallel to the drilling axis of the drill.

4. The handle according to claim 3 wherein said holding means includes means associated with said clamp means for securing said rod at the same time as said clamp means narrows said slot.

5. The handle according to claim 4 wherein: said clamp means includes:

a channel formed in said collar portion and extending across said slot substantially orthogonal thereto;

a threaded member positioned in said channel and having an enlarged head bearing against a first surface of said collar portion on a first side of said slot;

means for preventing said threaded member from rotating; and nut means threadedly engaging said threaded member and bearing against a second surface of said collar portion on the second side of said slot; and said holding means includes:

a bore extending through said collar portion along an axis parallel to said drilling axis, said bore being sized to closely accommodate said depth stop rod therethrough, said bore exposing a portion of said enlarged head of said threaded member to enable said enlarged head to engage said rod;

whereby rotation of said nut means in a first direction decreases the distance between said nut means and said enlarged head so as to deform said collar portion and narrow said slot and at the same time secure said rod in said bore.

6. The handle according to claim 1 wherein said slot is tapered with its greatest width being where it meets said circular opening.

* * * * *